May 12, 1942.  E. A. SLYE  2,282,678
REGISTERING MECHANISM
Filed April 1, 1939  9 Sheets-Sheet 1

Inventor
EDWARD A. SLYE
By Lindsey and Robillard
Attorneys

May 12, 1942.  E. A. SLYE  2,282,678
REGISTERING MECHANISM
Filed April 1, 1939   9 Sheets-Sheet 2

Inventor
EDWARD A. SLYE
By Lindsey and Robillard
Attorneys

May 12, 1942.  E. A. SLYE  2,282,678
REGISTERING MECHANISM
Filed April 1, 1939  9 Sheets-Sheet 3

Inventor
EDWARD A. SLYE
By Lindsey and Robillard
Attorneys

May 12, 1942.   E. A. SLYE   2,282,678
REGISTERING MECHANISM
Filed April 1, 1939   9 Sheets-Sheet 5

Inventor
EDWARD A. SLYE
By Lindsey and Robillard
Attorneys

May 12, 1942.  E. A. SLYE  2,282,678
REGISTERING MECHANISM
Filed April 1, 1939  9 Sheets-Sheet 6
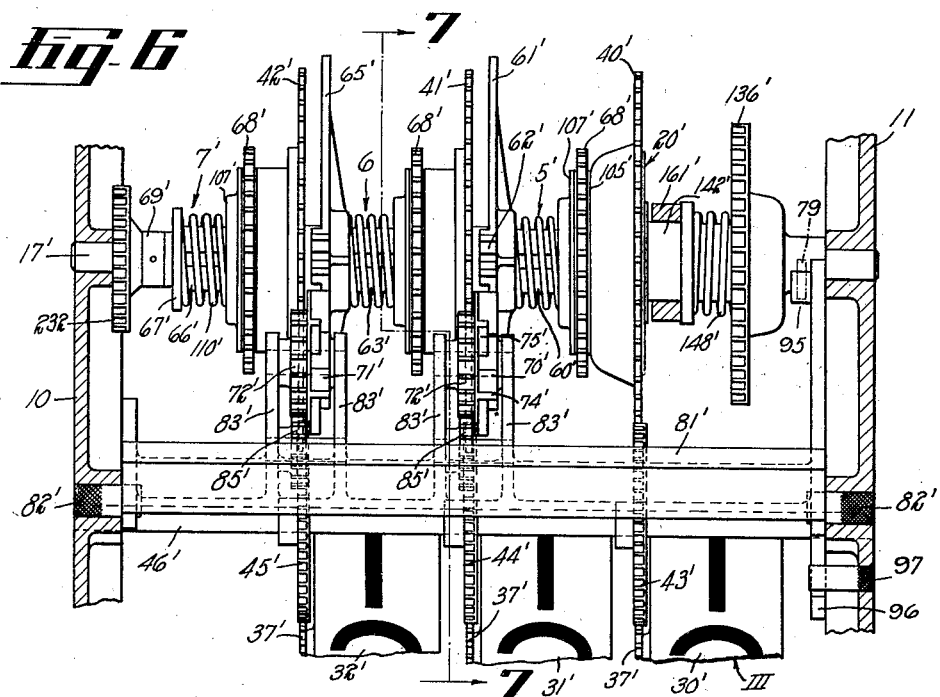
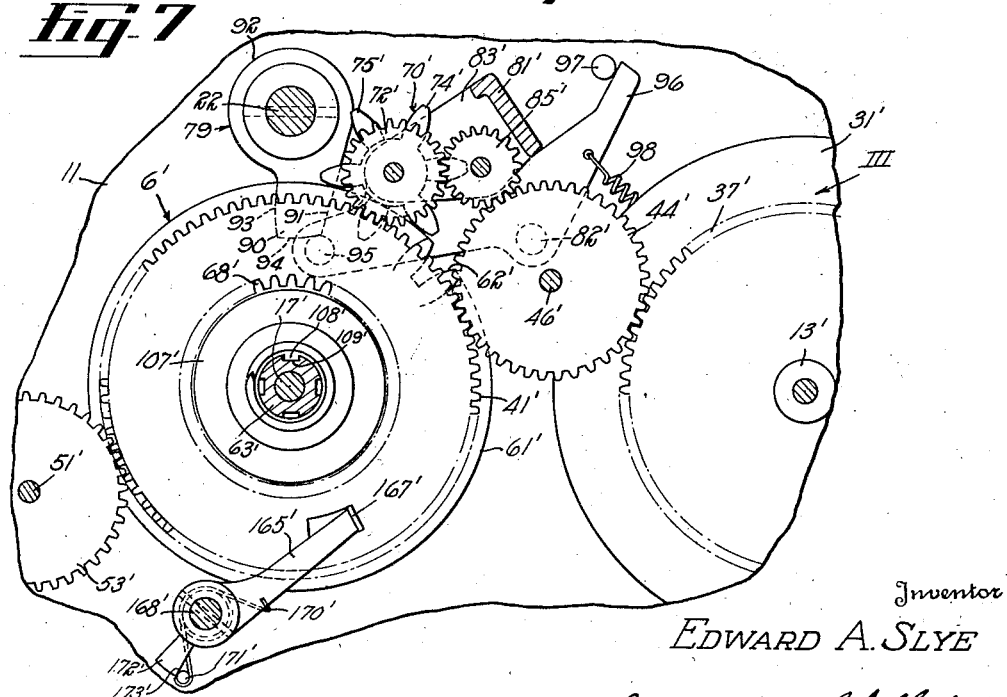
Inventor
EDWARD A. SLYE
By Lindsey and Robillard
Attorneys May 12, 1942.　　　　E. A. SLYE　　　　2,282,678
REGISTERING MECHANISM
Filed April 1, 1939　　　9 Sheets-Sheet 7

Inventor
EDWARD A. SLYE
By Lindsey and Robillard.
Attorneys

May 12, 1942.  E. A. SLYE  2,282,678
REGISTERING MECHANISM
Filed April 1, 1939   9 Sheets-Sheet 8
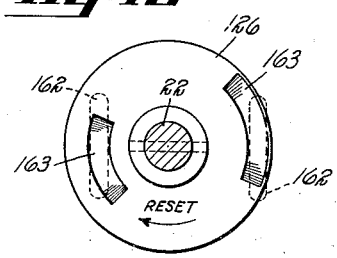
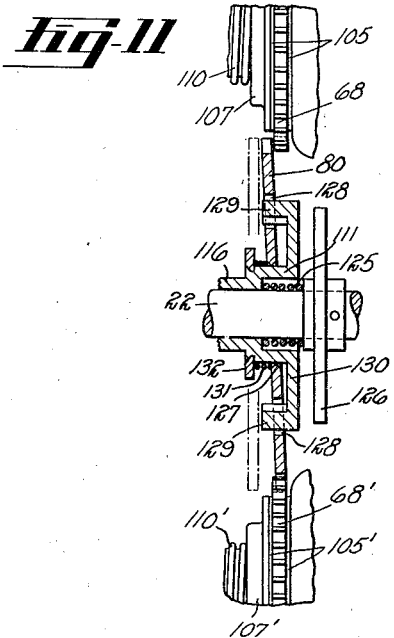
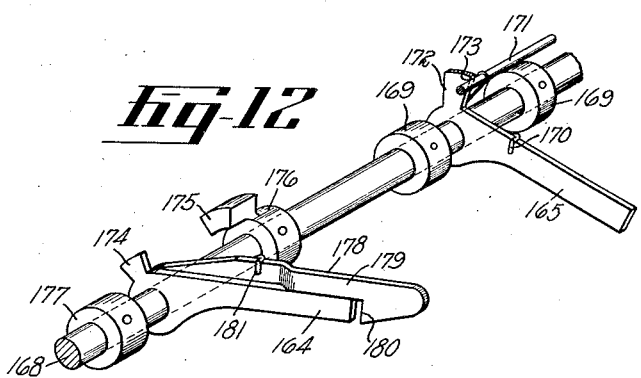
Inventor
EDWARD A. SLYE
By Lindsey and Robillard
Attorneys

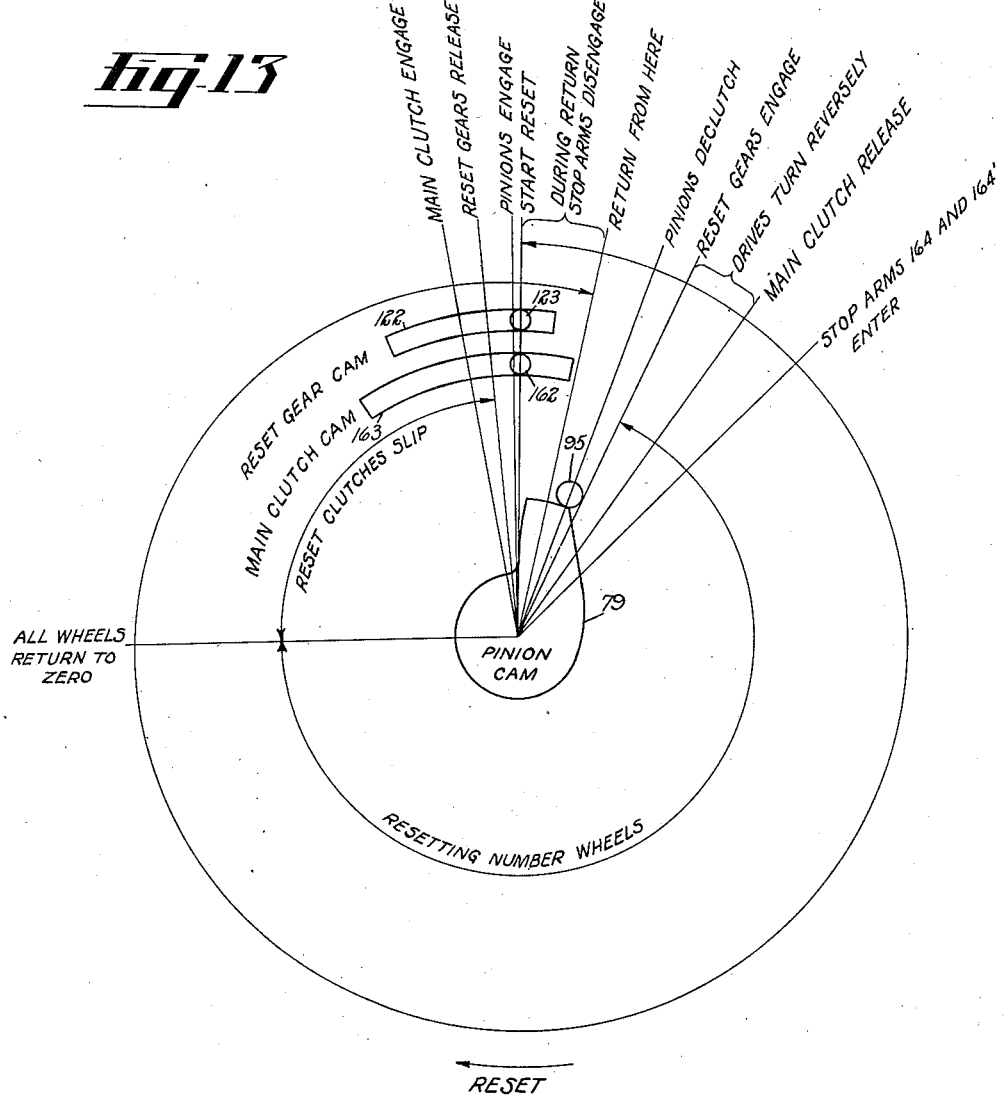

Patented May 12, 1942

2,282,678

UNITED STATES PATENT OFFICE 2,282,678

REGISTERING MECHANISM

Edward A. Slye, East Hartford, Conn., assignor to Veeder-Root Incorporated, Hartford, Conn., a corporation of Connecticut Application April 1, 1939, Serial No. 265,498

21 Claims. (Cl. 235—144)

This invention relates to registering or counting apparatus and has particular application in mechanisms having means for registering the total amount or number of units of material dispensed, and means for registering the total cost of the material dispensed on each transaction. As an instance of a use to which the improvements of the present invention may be applied, reference may be had to apparatus for dispensing gasoline or other fluids and wherein it is desired to register both the number of units dispensed and the cost thereof.

An aim of the invention is to provide an improved apparatus of this sort which is characterized by its ease, smoothness, and simplicity in operation and by its dependability and reliability in service and performance. The arrangement is such that the apparatus is very accurate in its operations; the resetting operations may be very easily and quickly effected; errors due to backlash or lost motion are largely eliminated; and fraudulent manipulation is prevented.

A further aim of the invention is to provide an improved registering or counting mechanism which is characterized by its simplicity in construction, its compactness in arrangement, its economy in manufacture, and the ease and facility with which the parts may be readily assembled.

A further aim of the invention is to provide an improved mechanism of this sort which is characterized by its durability, and by its accuracy and effectiveness in operation over a long period of time.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the accompanying drawings, wherein is shown for illustrative purposes one embodiment which the present invention may take:

Fig. 6 is a detail view showing the rotary order elements of the quantity registering mechanism together with the transfer pinions associated therewith, this view being a top plan view of what is shown in Fig. 7;

Fig. 7 is a vertical sectional view of the arrangement shown in Fig. 6, the same being taken substantially on line 7—7 of Fig. 6 and looking in the direction of the arrows.

Fig. 10 is a detail view of the cam through which the clutches in the drives are operated.

Fig. 11 is a detail view showing the manner in which the resetting gears are engaged.

Fig. 12 is a detail view showing, in perspective, the arrangement of certain stop arms, the collars between which the stop arms are mounted being shown as being displaced somewhat axially from their normal positions in the interest of clearness; and Fig. 13 is a chart showing more or less diagrammatically the sequence of steps which are performed during a resetting operation.

Figure 1:
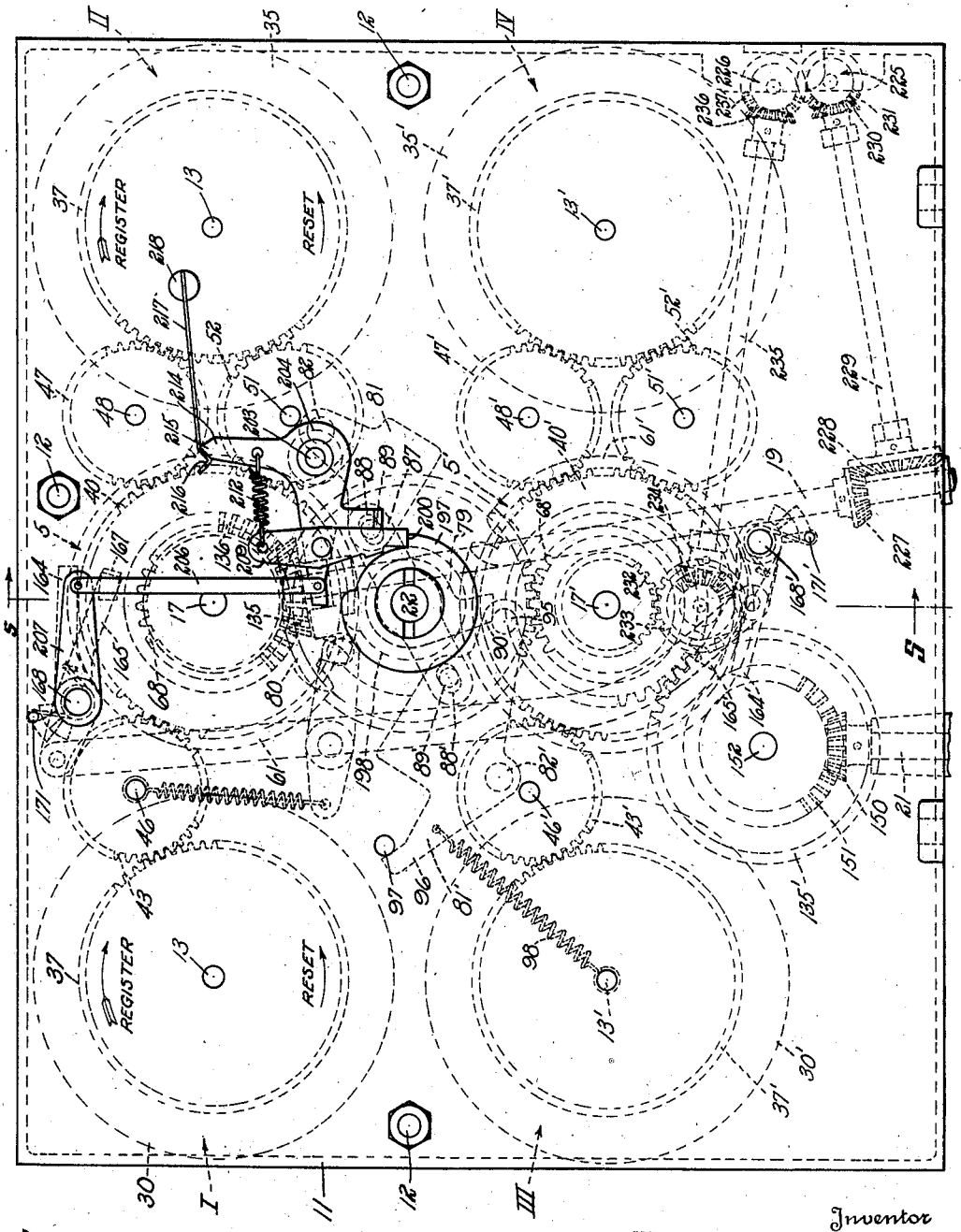
Figure 1 is a side elevational view of the apparatus as viewed from the right hand side of Fig. 5.

Referring generally to the construction shown in the drawings, the supporting structure for the counting mechanisms may be of any suitable construction and is here shown, for illustrative purposes, as comprising two side plates or frame members 10 and 11 secured in spaced relation by tie rods 12. Located in the upper portion of the supporting structure is the cost registering mechanism which includes two sets of numeral wheels I and II. The numeral wheels of the two sets are journaled on shafts 13 and are visible from opposite ends of the apparatus through windows 14 which are more or less diagrammatically illustrated in Fig. 2. The amount registering mechanism is generally similar to the cost registering mechanism and comprises two sets of numeral wheels III and IV respectively located beneath the two sets of wheels I and II. The numeral wheels of the two sets III and IV are respectively supported in side by side relation on shafts or rods 13', the ends of which are carried by the frame members 10 and 11. The wheels of the two sets III and IV are visible from opposite ends of the apparatus through windows 14'. The two sets of numeral wheels I and II of the cost registering mechanism are rotated through a set of rotary order elements 5, 6, and 7 supported by a shaft 17 located between, and generally in the plane of, the shafts 13. The two sets of amount registering counter wheels are likewise driven through a set of similar rotary order elements 5', 6', and 7' carried by a shaft 17' located between, and in the plane of, the shafts 13' and immediately below the shaft 17. The cost registering mechanism is driven through a shaft 19 which is adapted to be connected to a meter (not shown) of a dispensing pump, for example. This shaft 19, during a registering operation, drives the order element 5 of lowest order through a clutch indicated generally at 20. The amount registering mechanism may be driven through a shaft 21 which in turn may be driven at a selected speed relative to the shaft 19 through a speed variating mechanism or so-called variator. This shaft 21, during a registering operation, drives the order element 5' through a clutch indicated generally by the numeral 20'. The variator is not shown in the drawings as it may be of any suitable construction but, by way of example, reference may be had to the United States patent to Edward A. Slye, Patent No. 2,111,996 granted March 22, 1938, which shows a speed variating mechanism now in general use in dispensing pumps. As is usual in apparatus of this sort, the amount registering mechanism is directly driven by the meter so that the speed of the amount indicators will be determined by the speed of the meter, and the cost registering mechanism is driven in accordance with the selected unit price of liquid dispensed. The cost registering mechanism and the amount registering mechanism are adapted to be reset to zero after each dispensing operation by a reset operating shaft 22 located in the supporting frame centrally with respect to the four sets of counter wheels and midway between, and in the plane of, the two shafts 17 and 17' which carry the respective sets of order elements.

Figure 8:
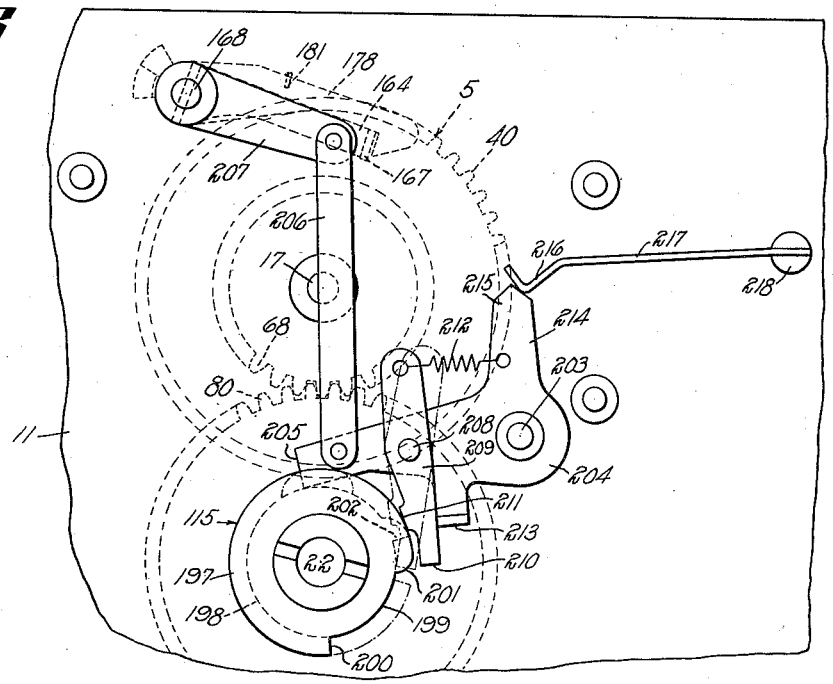
Fig. 8 is a detail view similar to Figure 1 and showing, in elevation, the means for operating certain stop arms for stopping the wheels of lowest order when the same are reset to zero.

In order that the following description may be more easily followed, particularly in connection with the steps performed during a resetting operation, reference may be had here to the chart shown in Fig. 13, it being understood that this chart is more or less diagrammatic and the angles illustrated therein are shown merely for the sake of exemplification. As therein shown, upon rotation of the reset operating shaft to effect a resetting operation, the following steps are effected in the sequence noted:

1. The transfer pinions, one of which is designated by the numeral 70, are disengaged from the driven gears and locking disks of the transfer mechanisms associated with the rotary order elements;
2. The reset driving gears 89 are engaged with the reset driven gears 68 and 68';
3. The drives leading to the counters are slightly turned reversely;
4. The main clutches 20 and 20' are disengaged or released and the drives are restrained;
5. The stop arms 164 and 164' for stopping the movement of the order elements of lowest order when the wheels associated therewith have been reset to zero, are brought to stopping positions;
6. The wheels have been returned to zero when the reset operating shaft has been turned to substantially three-fourth of a revolution;
7. The reset driven gears 68 and 68' slip with respect to the now stationary order elements until the reset gears are disengaged;
8. The main clutches 20 and 20' are engaged;
9. The reset gears are disengaged;
10. The transfer pinions are engaged when the reset operating shaft has been turned somewhat less than 360°;
11. The reset operating shaft is turned slightly beyond 360° and then turned back to starting position by the cam plate 121 and the follower pin 190, and during the reverse movement of the reset operating shaft, the stop arms 164 and 164' are moved to inoperative positions through the mechanism shown in Fig. 8 and which mechanism includes the cam 197.

Figure 4:
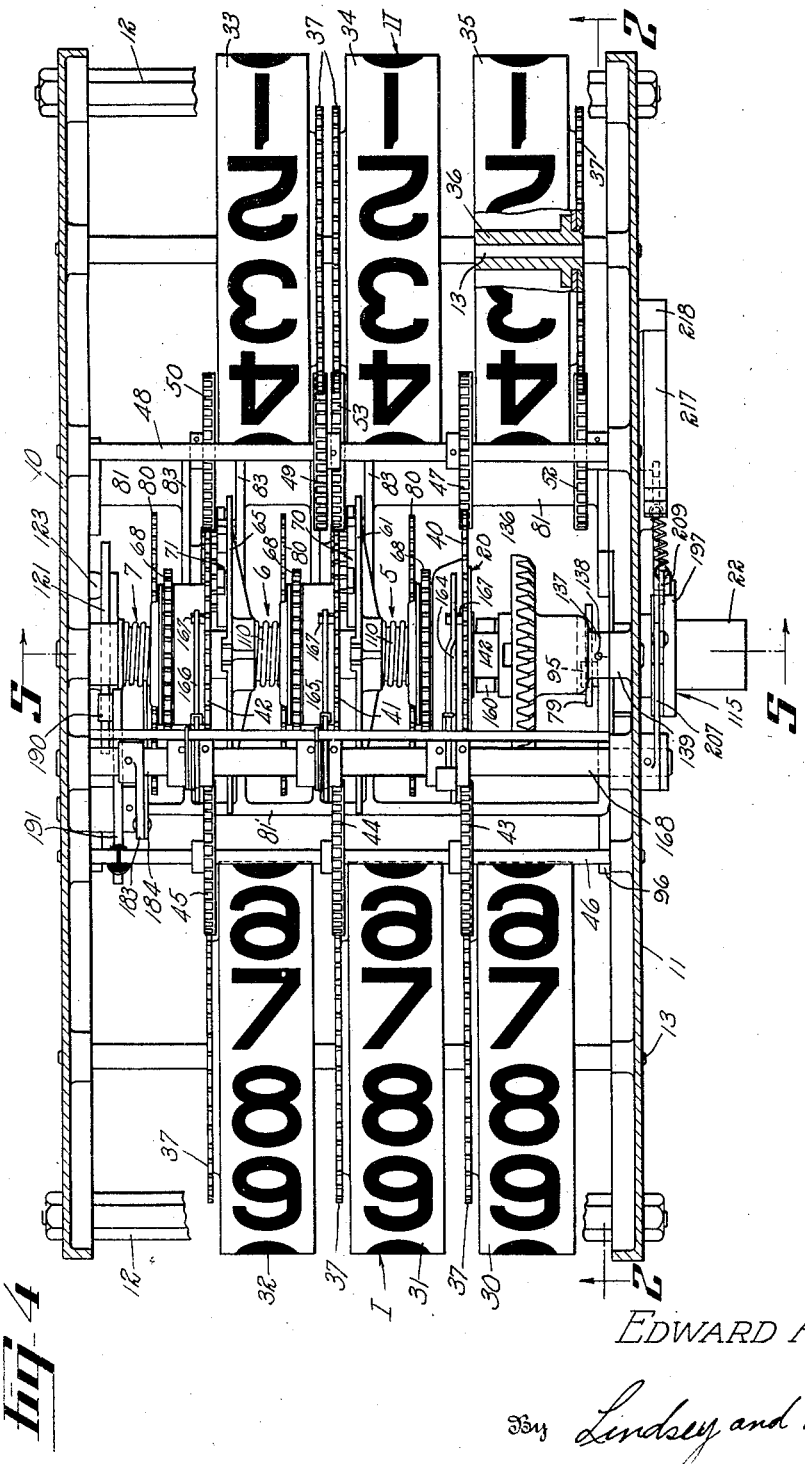
Fig. 4 is a top plan view of the apparatus with the two side frame members in section and parts broken away in the interest of clearness.

Reference will now be had more in detail to the construction and arrangement of the cost and amount registering mechanisms. These mechanisms are generally similar in construction and arrangement, and a description of one will generally apply to the other. In the two mechanisms, like parts are designated by similar reference numerals but the reference numerals as applied to the parts of the amount registering mechanism are primed except where otherwise noted. Referring first to the cost registering mechanism, it comprises generally, as previously stated, two sets of numeral wheels I and II and the interposed set of rotary order elements 5, 6, and 7, (see Fig. 4). The wheels of the set I are respectively designated by the numerals 30, 31, and 32 and may be taken to respectively represent units of cents, tens of cents, and dollars, for example. The wheels of the other set are designated by the numerals 33, 34, and 35. The wheels of the two sets are arranged in an order reverse, the reason for this being that the two sets are read from opposite ends of the apparatus. The wheels have on their peripheries numerals running from "0" to "9", as is usual. During a registering operation, the wheels of the two sets rotate in the direction of the feathered arrows of Fig. 2 from which it will be noted that the numerals of the wheels of the set I move upwardly past the left hand window 14, and the numerals of the wheels of the set II move downwardly past the right hand window 14. During a resetting operation, the wheels are rotated in the reverse direction as indicated by the unfeathered arrows in Fig. 2. The wheels may be of any suitable construction. In the present instance, each wheel comprising a hub 36 freely journaled on the shaft 13, a cup-like body portion secured to the hub and bearing the numerals on its periphery, and a driven gear 37 secured to the hub, as is most clearly shown in the lower right hand corner of Fig. 4.

The set of rotary order elements 5, 6, and 7 is, as has previously been stated, supported on the shaft 17 located between the sets of wheels I and II. The construction of these order elements will be clearly understood on reference to Fig. 5 wherein the order elements 5, 6, and 7 of the cost registering mechanism are shown in elevation and the order elements 5', 6', and 7' of the amount registering mechanism are shown in section. As hereinafter described more in detail, the order element 5 of lowest (cents) order is driven through the clutch 20, and upon one complete revolution of that element, the second order element 6 of higher (dime) order is advanced one-tenth of a revolution through suitable transfer mechanism, and upon a complete revolution of the rotary order element 6, the third order element 7 of highest (dollar) order will be advanced one step through similar transfer mechanism. The elements 5, 6, and 7 are respectively provided with gears 40, 41, and 42 which serve to drive, through intermediate gears, the gears 37 fixed to the numeral wheels. In the present instance, the wheels 30, 31, and 32 of the set I are directly driven from the order wheel gears 40, 41, and 42 through intermediate gears 43, 44, and 45, respectively. The latter gears are journaled on a fixed shaft 46. As the wheels of the set II are in reverse order to those of the set I (the two sets being observable from opposite ends of the apparatus), the drives between the order wheel gears and the counter wheels 33, 34, and 35 are somewhat different. In the present instance, in order to drive the cents wheel 33, the gear 40 is meshed with an intermediate gear 47 fixed to a shaft 48 to which is also fixed a like gear 49 meshed with the gear 37 fixed to the wheel 33. The wheel of highest (dollar) order 35 is driven from the gear 42 through an intermediate gear 50 fixed to a shaft 51 (see Fig. 2) to which is also fixed a like gear 52 meshed with the gear 37 fixed to the wheel 35. The intermediate gear 34 is driven in a manner similar to the gear 31 through an intermediate gear 53 freely journaled on the shaft 51.

The arrangement of the two sets of numeral wheels III and IV is substantially identical to the above described arrangement of the wheels of the cost registering mechanism. The wheels of the set III are respectively 30', 31', and 32' (see Fig. 6) and those of the set IV are 33' (see Fig. 3) 34', and 35' (see Fig. 2). These wheels are journaled on the shafts 13' and each has a gear 37'. The wheels 30', 31', and 32' are respectively driven (see Fig. 6) from the order element gears 40', 41', and 42' through intermediate gears 43', 44', and 45' journalled on a shaft 46'. The cents wheel 33' of the set IV is driven from the gear 40' of lowerst order 5' through intermediate gears 47' and 49' which are fixed to the shaft 48', and the dollar wheel 35' of the set IV is driven from the gear 42' of the order element 7' through intermediate gears 50' and 52' fixed to the shaft 51'. The dime wheel 34' is driven through the intermediate gear 53' journaled on the shaft 51'.

The two sets of order elements, respectively associated with the cost registering mechanism and the amount registering mechanism are identical in construction and the following description of the order elements of the cost registering mechanism will suffice as a description for the other set. The corresponding parts of the two mechanisms bear like reference numerals but the reference numerals associated with the parts of the order elements of the amount registering mechanism are primed. The construction of the order elements will be most clearly understood upon reference to Fig. 5 of the drawings. The order element 5 of lowest (cents) order comprises a sleeve 60 journaled on the shaft 17 and having on one end the gear 40 through which the cents wheels 30 and 33 are both driven as previously described. Fixed, as by means of a driving fit, on the other end of the sleeve 60, is a transfer locking disk 61 carrying a mutilated driving gear comprising two teeth 62 with a notch therebetween. The order element 6 of next higher (dime) order is similar to the order element 5, the same having a sleeve 63 carrying on one end the gear 41 through which the dime wheels 31 and 34 are driven, this gear 41 also serving as a driven gear of the transfer mechanism through which the mutilated gear 62, by means of a transfer pinion 70, advances the order element 6 one step upon each complete revolution of the order element 5. On the other end of the sleeve 63 is fixed a locking disk 65 similar in construction and operation to the locking disk 61. The order element 7 is provided with a sleeve 66 to which is fixed the gear 42 which drives the dollar wheels 32 and 35, this gear 42 serving as the driven gear of the transfer mechanism through which the locking disk 65, by means of a transfer pinion 71, advances the order element 7 one step upon each revolution of the order element 6. On the left hand end of the sleeve 66 is fixed a disk 67. Each of the order elements carries a reset gear 68, the arrangement and purpose of which will be later described. Fixed to the shaft 17 and interposed between the sleeve 66 and the side frame member 10 is a collar 69.

Figure 9:
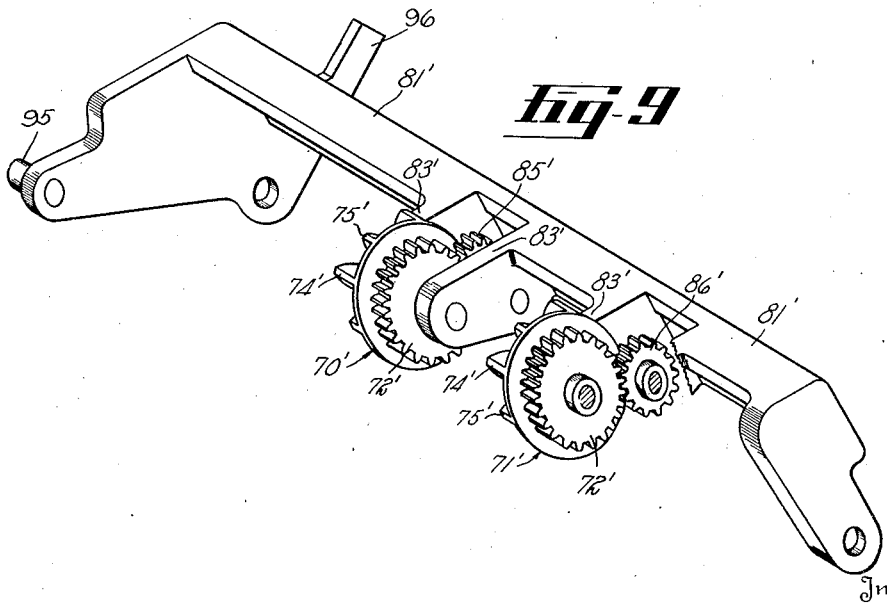
Fig. 9 is a perspective view of one of the yokes or carriers which support the transfer pinions.

As stated, the carrying movement from an element of one order to the next higher order element is effected through a transfer pinion. The several pinions 70 and 71 of one set, and the pinions 70' and 71' of the other set are identical in construction and operation so specific reference need only be made to the transfer pinion 70' between the order elements 5' and 6' of the amount registering set (see Figs. 6, 7 and 9). It will there be observed that the pinion 70' has a gear 72' meshing with the gear 41' of the dime order element 6'. It also has alternately disposed wide teeth 74' and narrow teeth 75'. The wide teeth, as shown most clearly in Fig. 7, are adapted to cooperate in the usual manner with the locking disk 61' so as to prevent, during a registering operation, rotation of the transfer pinion except when the same is rotated by the mutilated gear 62'. When the locking disk 61' has made a complete revolution, the mutilated gear 62' of that locking disk will engage one of the narrow teeth 75' thereby causing a partial rotation of the transfer pinion whereupon the rotary element 6' and the associated dime numeral wheels are advanced one step.

As hereinafter described more in detail, when the reset operating shaft 22 is turned to effect a resetting operation, driving reset gears 80 associated with that shaft are engaged with the driven reset gears 68 frictionally carried by the order elements 5, 6, and 7 of the cost registering mechanism and with the corresponding driven reset gears 68' carried by the order elements 5', 6', and 7' of the amount registering mechanism, and then the respective order elements are turned relative to the shafts 17 and 17' supporting the same until the counter wheels have been brought to zero and thereafter the driving reset gears are disengaged from the driven reset gears. As the order elements are rotated relative to one another during the resetting operation, it is necessary to disengage the transfer pinions from the locking disks and it is also desirable to prevent accidental rotation of the transfer pinions while they are disengaged from the locking disks. To these latter ends, arrangements generally similar to that disclosed and claimed in my United States Patent No. 1,980,232 granted Nov. 13, 1934, are employed. In the present illustrative disclosure, the transfer pinions 70 and 71 are carried by a pivoted yoke or carrier 81 (see Figs. 2, 4, and 5), the transfer pinions 70' and 71' are carried by a similar pivoted yoke or carrier 81', (see Figs. 6, 7 and 9) and means in the form of a cam 79 (see Fig. 7) is provided for the purpose of swinging these yokes in order to disengage the pinions from the locking disks and driven gears of the transfer mechanisms during the operation of resetting the numeral wheels to zero. In order to maintain the transfer pinions in geared relation with the driven gears of the transfer mechanisms, and thus maintain the transfer pinions in proper alignment during resetting, there is associated with each transfer pinion an idler gear carried by the switch yoke and maintained in meshed relation through an intermediate gear with the associated driven gear of the transfer mechanism. More particularly, referring to the arrangement shown in Figs. 6, 7 and 9 the transfer pinions 70' and 71' associated with the order elements of the amount registering mechanism are carried by the yoke 81' pivoted on studs 82' carried by the side plates 10 and 11. These pivot studs are parallel to and spaced slightly from the shaft 46' which carries the intermediate gears 44' and 45' through which the dime wheel 31' and the dollar wheel 32' of the set of wheels III of the amount registering mechanism are driven. The yoke has two pairs of arms 83' in which the transfer pinions 70' and 71' are journaled. These transfer pinions, as previously stated, engage the gears 41' and 42' of the associated order elements 6' and 7'. Carried by the yoke and in constant mesh with the gear portion 72' of the pinion 70' and also with the intermediate gear 44' is an idler gear 85' which, as previously stated, is in mesh with the gear 37' of the dime wheel 31'. There is a like idler gear 86' between the transfer pinion 71' and the intermediate gear 15', the latter gear, as previously stated, being in mesh with the gear 42' of the order element 7' and the gear 37' of the dollar wheel 32'. The transfer pinions 70 and 71 associated with the order elements of the cost registering mechanism are carried by a yoke 81 of like construction as the yoke 81'. The yoke 81 is pivoted on studs 82 which are parallel to and spaced slightly from the shaft 51 which carries the intermediate gears 50 and 53. Interposed between the transfer pinion 70 and the intermediate gear 53 is an idler 85, and interposed between the pinion 71 and the intermediate gear 50 is an idler 86, and these correspond in arrangement and function to the previously described idlers 85' and 86'.

Figure 2:
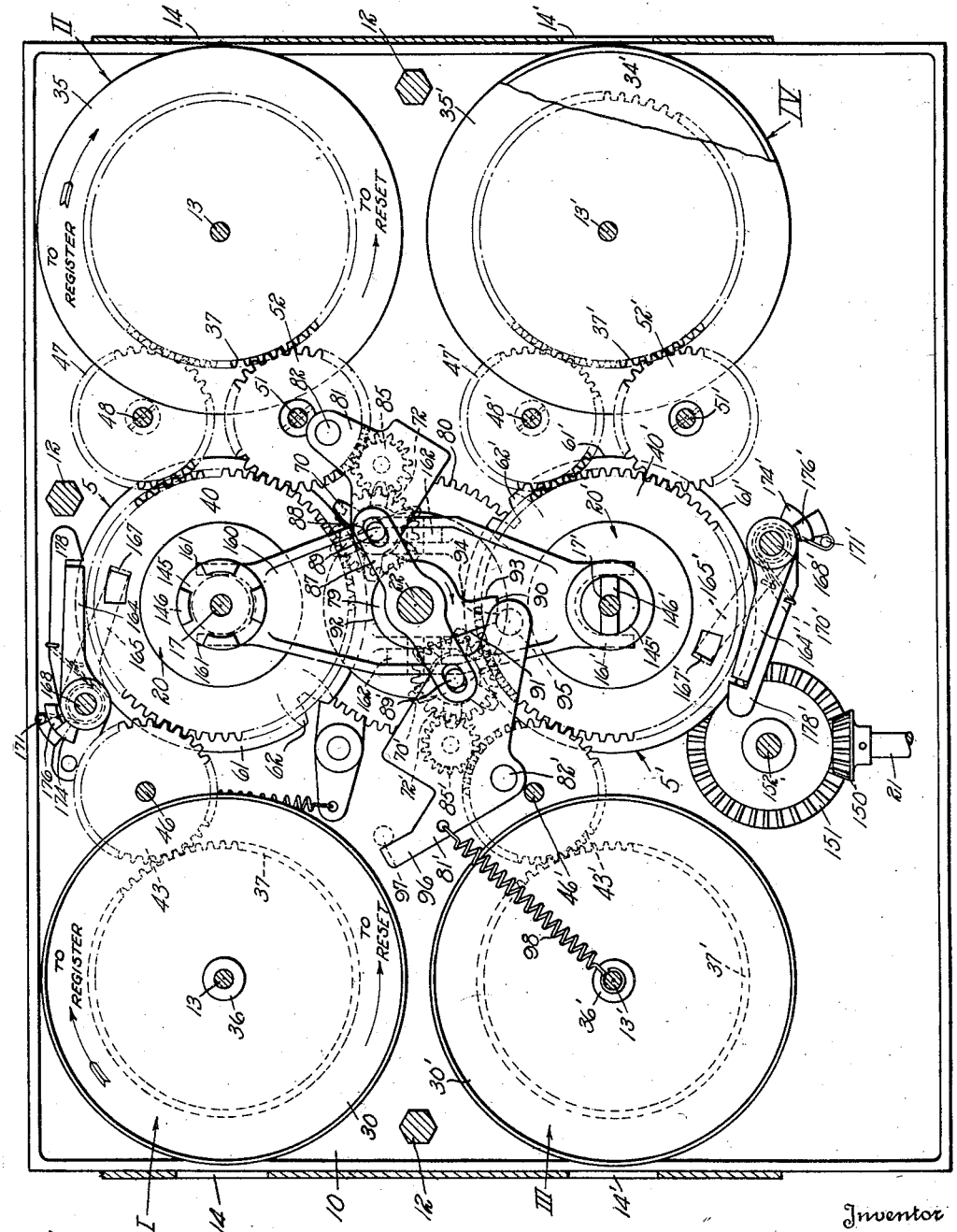
Fig. 2 is a view similar to Fig. 1 but with the near side frame member 11 removed, this view being taken substantially on line 2—2 of Fig. 4.

In order that the two pivoted yokes 81 and 81' may swing in unison, they are connected together by means of a lever 87 which, as shown in Fig. 2, is journaled or pivoted on the reset operating shaft 22. The opposite ends of this lever has elongated slots 88 and 88', respectively, in which work pins or studs 89 and 89' respectively project from the ends of the two yokes. The cam 79 has a projecting lobe or arm 90, the forward face 91 of which is generally tangential to the concentric portion 92 of the cam. The rear face 93 of the arm 90 is generally radially disposed with respect to the center of rotation of the cam. The end of the arm has a land or dwell 94 generally concentric to the center of rotation of the cam. The right hand end of the yoke 81' (Figs. 2 and 4) has an inwardly extending follower pin 95 adapted to engage the periphery of the cam 79. The yoke 81' also has an arm 96 adapted to engage a stop pin 97 carried by the side frame member 11 in order to limit the extent to which the yokes may be moved to their normal positions shown in Figs. 2 and 7. A tension spring 98, connected at its opposite ends to the arm 96 and to one of the shafts 13', tends to urge the yokes to a position where the transfer pinions are disengaged. During the normal registering operation of the apparatus, the parts are in the position shown in Figs. 2 and 7 wherein the arm 90 of the cam 79 maintains the yokes in the positions shown and in which positions the transfer pinions are engaged with the locking disks and driven gears of the respective order elements. When it is desired to reset the numeral wheels, the reset shaft is turned clockwise, reference being had to Fig. 2, with the result that the arm 90 will be withdrawn from the follower pin 95 whereupon the spring 98 will swing the yokes 81 and 81' counterclockwise, thus disengaging the transfer pinions. The extent to which the spring can thus swing the yokes is limited by the fact that the pin 95 will ride upon the concentric portion 92 of the cam 79. During the resetting operation, the transfer pinions will be maintained in the proper alignment due to the fact that the idler gears 85, 86, 85' and 86' in mesh respectively with those pinions are also in mesh with the intermediate gears which, in turn, are in mesh with the driven gears of the rotary order elements. After the numeral wheels have been reset to zero, and upon continued rotation of the cam 79, the face 91 of the cam will force the follower pin 95 outwardly and when the cam comes to the position shown in Fig. 2, the rotation of the reset shaft and the cam is stopped. The parts are now back in their normal positions. It may be pointed out here that the cam 79 and the pin 95 constitute means for preventing the reset shaft from being rotated in the reverse direction after the reset shaft has been initially rotated in the correct direction to effect a resetting operation. More particularly, it will be noted that upon a slight rotation of the cam 79 in the direction of the arrow shown in Fig. 2, the pin 95 rises to a position behind the rear face 93 of the arm 90 and, thereafter, the arm cannot be rotated counterclockwise back to the normal holding position shown in Fig. 2.

Figure 5:
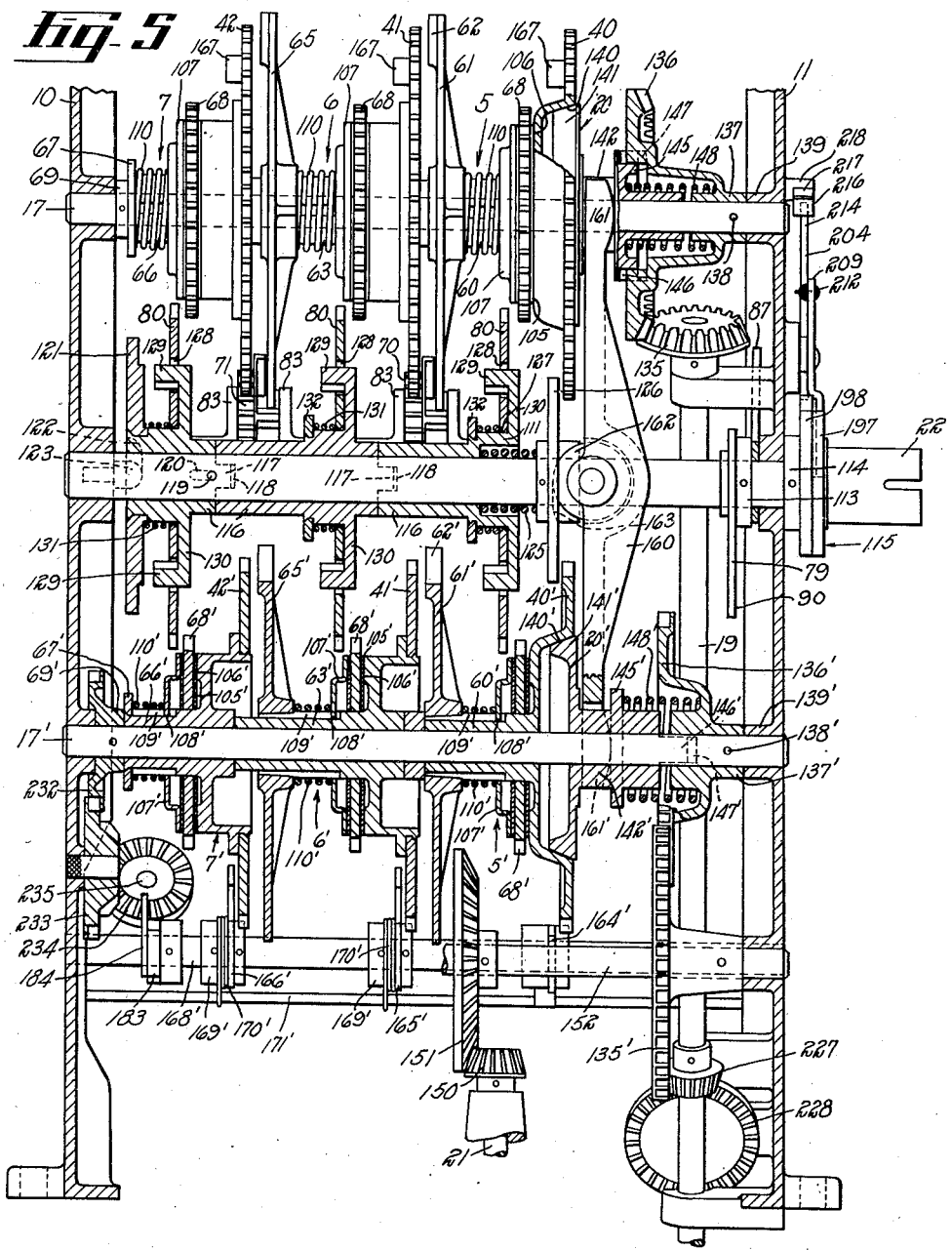
Fig. 5 is a vertical transverse sectional view through the apparatus, the same being taken substantially on lines 5—5 of Figs. 1 and 4.

Reference will now be had to the arrangement for resetting the numeral wheels back to zero, particular attention being had to Fig. 5. As previously stated, upon initial rotation of the reset operating shaft 22, the driving reset gears 80 associated with that shaft are engaged with the driven reset gears 68 and 68' which are frictionally carried by the several order elements 5, 6, and 7, and 5', 6', and 7'. On further rotation of the reset operating shaft, each order element is turned to a zero position and then the driven reset gears 68 and 68' will rotate with respect to the now stationary order elements. When the reset operating shaft has been rotated through an angle of somewhat less than 360°, the driving gears 80 are disengaged. As shown in Fig. 5, each of the driven reset gears 68' is interposed between two friction disks 105' which, in turn, are interposed between a face 106' on the hub or body portion of the associated rotary order element and a spring pressed plate 107'. The spring pressed plate is adapted to move longitudinally of the hub of the element on which it is located and, in order to prevent rotation of the plate relative to the hub, the plate has an internal lug 108' engaging in a longitudinal groove 109' in the hub or sleeve. The plate is urged towards the face 106' by a coiled spring 110'. The driven gears 68 are provided with friction clutches similar to those just described, and the corresponding parts of these clutches bear similar reference numerals except they are not primed.

Figure 3:
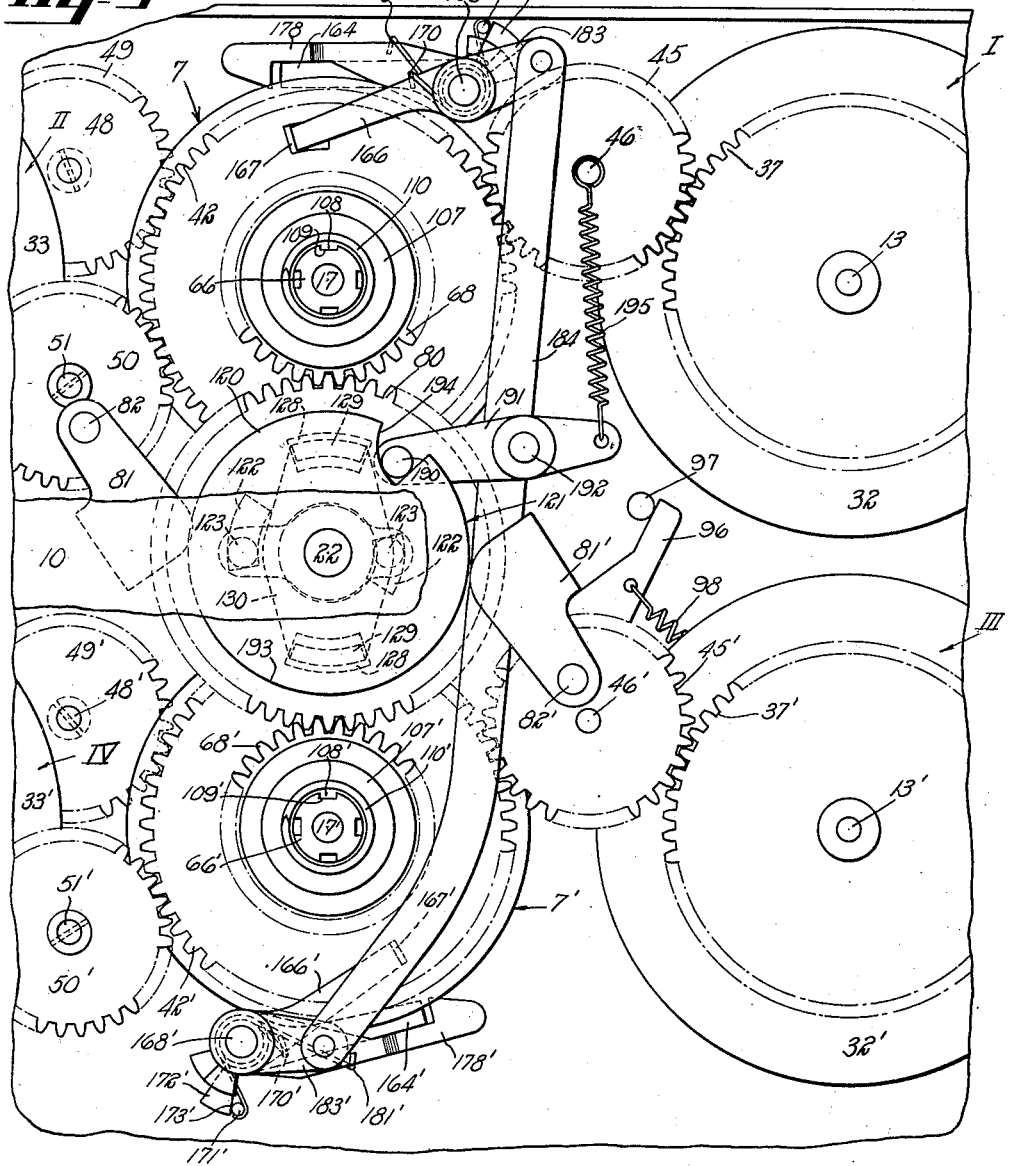
Fig. 3 is a side elevational view looking at the other side of the apparatus with the left hand side frame plate 10 broken away.

The reset operating shaft 22 is fixed against axial movement by the boss 113 of the cam 79 and the boss 114 of a cam 115 (to be later described), these bosses being to opposite sides of the frame member 11. As shown most clearly in Fig. 5, carried by this shaft for rotary movement therewith, but for slight longitudinal movement relative thereto, is a sleeve which comprises three hubs 116. The reset driving gears 80 are respectively carried by these hubs. These hubs are connected together so as to rotate in unison, and to this end the abutting ends of the hubs have interengaging tongues 117 and recesses 118. The left hand end hub 116 is connected to the shaft 22 by a pin 119 and the hub has elongated slots 120 for accommodating the ends of the pin 119 so that the hub may have a limited movement longitudinally of the shaft. For the purpose of moving the sleeve comprising the hubs 116 longitudinally of the reset shaft and thereby engage the driving reset gears with the driven reset gears upon initial rotation of the reset operating shaft 22, there is secured to the left hand hub 116 a cam 121 having on its inner face two concentric cam grooves 122 (see Fig. 3), with which cooperate two pins 123 carried by the side frame 10. Normally, the pins 123 engage in the grooves 122 as shown in Figs. 3 and 5 and as diagrammatically shown in Fig. 13. The hubs 116 are normally urged towards the left (Fig. 5) by means of a spring 125 surrounding the reset operating shaft 22 and interposed between the right hand hub 116 and the boss of a clutch operating cam 126 fixed to that shaft. This spring resiliently maintains the face of the cam 121 against the ends of pins 123 and moves the hubs to the left (thereby disengaging the gears 80 from the gears 68, 68') when the pins ride into the cam grooves 122. The gears 80 are carried by the hubs 116 in such manner that they will rotate therewith and also in such manner that they may move slightly longitudinally of the hubs and cant or tilt slightly with respect thereto so that the gears 80 may be properly meshed with the driven reset gears 68 and 68'. To these ends (see Figs. 5 and 11) each gear 80 has a central opening which receives a hub 111, the wall 127 of this opening being V-shaped in cross section so that it has a more or less point or line contact with the periphery of the hub. Each gear has spaced from its central opening, two diametrically disposed arcuate openings 128 which loosely receive two similarly shaped lugs 129 carried by radial arms 130 forming portions of the associated hub. The gear 80 is urged against the opposing face of these arms by a spring 131 coiled about the hub and bearing at one end against the gear 80 and at the other end against a suitable abutment 132 carried by the hub. With this arrangement, it will be observed that upon rotation of the reset operating shaft the cam 121 is turned, and when the pins 123 ride out of the grooves 122, the hubs 116 are moved to the right (Fig. 5) to engage the gears 80 with the driven gears 68 and 68'. In the event that the teeth of a driving gear 80 are not properly aligned with the spaces between the teeth of associated driven gears 68 and 68', the end faces of the teeth of the latter gears will engage the end faces of the opposing teeth of the driving gear so that the driving gear will lag behind the axial movement of the associated hub until the driving gear has been rotated to such an extent that the driving gear may move into mesh with the driven gears. This will be clear from Fig. 11 wherein the hub 116 is shown as having been moved to its extreme right hand position, and during such movement the gear 80 has ridden into mesh with the driven gear 68' but the teeth of the gear 80 clash with the teeth of the gear 68. It will be noted that the gear 80 is canted somewhat out of a vertical plane. When the gear 80 has been rotated to such an extent that it may ride into meshing relation with the teeth of the gear 68, the spring 131 will cause the gear to assume a vertical position in which it meshes with both of the gears 68 and 68'.

As previously stated, the cost registering mechanism is driven from the variator shaft 19 through a clutch 20, and the amount registering mechanism is driven through the meter shaft 21 through a similar clutch 20'. In the present illustrative disclosure, particular reference being had to Fig. 5, the upper end of the shaft 19 carres a bevel gear 135 meshing with a bevel gear 136 having a hub 137 pinned, as at 138, to the order element shaft 17. The right hand end of the hub 137 is adapted to engage the inner end of a boss 139 preferably formed integrally with the side plate 11. The clutch 20 is interposed between the gear 136 and the first order element 5. In the present instance, the driven clutch member constitutes the gear 40, the latter having a conical clutch face 140. The driving clutch member has a head 141 provided with an external conical face corresponding to and adapted to engage the clutch face 140. The head 141 is carried by a sleeve 142 having a limited sliding movement on the shaft 17 and relative to the gear 136. In order that the driving clutch member will rotate with the gear 136 but may be moved axially thereof, the driving clutch member carries a collar 145 having four lugs 146 (see Fig. 2) engaging in correspondingly shaped grooves 147 in the gear 136 as shown in Fig. 5. The driving clutch member is urged into clutching relation with the gear 40 by a spring 148. Referring to the drive for the amount registering mechanism, this is generally similar to that described in connection with the cost registering mechanism. On the upper end of the meter shaft 21 is a gear 150 meshing with a gear 151 fixed to a jackshaft 152 which carries a gear 135' in mesh with a gear 136' fixed to the order element shaft 17' in the same manner as is the gear 136 fixed to the shaft 17. The clutch 20' is similar to the clutch 20, the same having a conical clutching face 140' and a driving clutch member provided with a conical head 141' and a sleeve 142'. The right hand end of this sleeve has two lugs 146' (see Fig. 2) slidably engaging in correspondingly shaped grooves 147' in the hub portion of the driven gear 136' as shown in Fig. 5. Between a collar 145' on the sleeve 142' and the gear 136' is a spring 148'.

Upon rotating the operating reset shaft 22 to effect a resetting operation, the transfer pinions are first disengaged, the driving reset gears are engaged with the driven reset gears as heretofore described, then the driving trains leading to the clutches 20 and 20' are turned backwardly slightly for a purpose later described, and then the clutches 20 and 20' are disengaged by the heretofore mentioned clutch operating cam 126. This cam operates through a shipper member 160. This member 160 (see Figs. 2 and 5) is slidable on the shaft 22 and extends upwardly and downwardly therefrom. The upper end is bifurcated to provide a pair of arms 161 which straddle the clutch sleeve 142 and engage against the opposing face of the collar 145 carried by that sleeve. Similarly, the lower end of the shipper member is bifurcated so as to provide arms 161' which straddle the sleeve 142' and engage the collar 145'. Rotatably carried by the shipper member to opposite sides of the reset shaft 22 are rollers 162 which engage the cam face of the cam 126. This cam face (see Fig. 10) has two diametrically opposite concentrically arranged recesses or wells 163 into which the rollers are adapted to ride. These recesses are spaced at different distances from the center of rotation of the cam so that each roller will cooperate only with one respective recess when the cam makes one complete rotation. When the reset shaft is in the normal position shown in the drawings, the rollers engage in these recesses adjacent the forward ends thereof so that, upon rotation of the reset shaft, the rollers will remain in these recesses until after the transfer pinions have been disengaged, the reset gears have been engaged and the order elements have been rotated backwardly to a slight extent and then the rollers 162 ride out of the recesses 163 onto the dwell or flat face portions of the cam 126 with the result that the shipper member is moved in a direction to disengage the clutches 20 and 20'. While the rollers are riding on the dwell portions, the numeral wheels are reset and thereafter the rollers ride back into the recesses resulting in the clutches again becoming engaged under the influence of the springs 148 and 148'.

In order to avoid errors in the registering operation due to backlash and looseness in the driving trains, the arrangement is such that upon each resetting operation the driving trains are turned slightly backwardly and then the elements of the driving trains are restrained against relative movement until the next registering operation is initiated. Thus, at the start of each registering operation, each driving gear of the trains is in proper engagement with its cooperating driven gear and starts its driving function as soon as it starts rotating. For example, if there should be any looseness between the gears 135 and 136 in the train leading to the cost registering mechanism, the gear 136 upon initial rotation of the order element 40 is turned backwardly slightly so as to bring the rear faces of the teeth of the gear 136 into engagement with the front faces of the teeth of the gear 135, and then the gears are retained in this proper cooperative relation so that on the next registering operation the gear 135 immediately picks up the gear 136 without any lost motion. These results are effected by the fact that the clutches 20 and 20' are not disengaged until shortly after the order elements 5 and 5', respectively, are initially turned backwardly on a resetting operation. During the interval between the engagement of the reset driving gear 89 with the reset driven gears 68 and 68' of the order elements of lowest order and the declutching of the clutches 20 and 20' by the clutch operating cam 126, the gears 136 and 136' are turned slightly in a direction reverse to that in which they rotate during a registering operation, and this reverse movement is carried down through the drives which, in the case of the cost registering mechanism, also includes the variator (not shown). Upon disengaging the clutches 20 and 20', restraining means is brought into play to prevent movement and displacement of the elements of the driving trains as the resetting operation proceeds. This restraining means includes, in the case of the cost registering mechanism, the spring 148, and the contacting surfaces between the boss 139 and the hub 137 of the gear 136 and, in the case of the amount registering mechanism, it includes the spring 148' and the interengaging faces between the boss 139' and the hub 137' of the gear 136'. More particularly, it will be observed that when the clutch 20 is engaged, the spring 148 does not urge the shaft 17 in either direction because the force of the spring is expended against the gear 136 anchored to one end of the shaft 17 and against the collar 69' anchored to the shaft 17 at its other end. However, when the clutch 20 is disengaged, the shipper member 160 prevents movement of the driven clutch sleeve 142 towards the left (Fig. 5) and, therefore, the spring 148 urges the hub 137 of the gear 136 into frictional engagement with the end of the boss 139. This frictional engagement is such as to hold the elements of the drive against displacement. As the resetting operation is about to be completed, the clutches are again engaged and then the reset gears are disengaged so that there can be no displacement of the driving elements of the trains during that interval. The parts now remain in this position until the next registering operation is initiated.

In order to stop the numeral wheels when they have reached zero positions, there are provided suitable stop arms cooperating with the order elements through which the wheels are driven. The stop arms associated with the cost registering mechanism and those associated with the amount registering mechanism are of corresponding structure and, therefore, like numerals are employed to designate like parts except that the parts associated with the amount registering mechanism are primed. The stop arms associated with the order elements 5, 6 and 7 of the cost registering mechanism are respectively designated by the numerals 164, 165, and 166. These stop arms are adapted to respectively cooperate with stop lugs 167 projecting from the gears 40, 41, and 42 of the respective order elements. The stop arms 165 and 166 are identical in construction and operation. As most clearly shown in Figs. 3 and 12, the arm 166 is pivoted to a rock shaft 168 journaled in the side frame members 10 and 11 adjacent the order elements of the cost registering mechanism. The arm is held against movement longitudinally of the rock shaft by collars 169 pinned to the shaft. The arm is normally urged to a stopping position (that is, to a position where its free end is in the line of movement of the cooperating lug 167 of the associated gear 42) by a spring 170, one end of which is anchored to the rod 171 and the other end of which is hooked over the edge of a projection 172 extending from the pivoted end of the arm. Downward swinging movement of the arm is limited by the fact that the edge 173 of the lug or projection 172 engages the rod 171. It will be observed that when the reset shaft 22 is rotated to effect a resetting operation, the order element 7 will be rotated clockwise with respect to Fig. 3, and when the dollar wheels 32 and 35 reach zero position, the lug 167 of the order element gear 42 will engage the free end of the stop arm 166, thus stopping further rotation of the order element 7. The driven reset gear 68 will slip with respect to the now stationary order element 7. During a registering operation, the order wheel gear 42 rotates counterclockwise with respect to Fig. 3, and the lug 167 will ratchet past the stop arm 166.

The stop arms 164 and 164' associated with the order elements 5 and 5' of lowest denomination are positively moved into and out of stopping position in timed relation to the engagement of the main clutches 20 and 20'. These two stop arms are of like construction so specific reference need be had only to the stop arm 164 shown in Fig. 12. This arm is journaled on the rock shaft 168 and has a lug 174 which cooperates with a lug 175. This lug 175 is carried by a collar 176 fixed to the rock shaft 168. To the other side of the arm is a collar 177. Also journaled on the shaft 168 between the collar 176 and the arm 164 is a latch 178 for preventing rebound of the order element 5 which may occur should, during the resetting operation, the lug 167 on the gear 40 be brought sharply against the free end of the arm 164. This latch has an offset portion 179, the lower edge of which engages the upper edge of the arm 164. The free end of the latch has an abutment 180 normally opposed to the free end of the arm. A spring 181 anchored at one end to the rod 171 and having its other end hooked over the latch 178 tends to urge the latch and arm to operative positions. During the registering operation, the arm 164 is held in the raised inoperative position shown in Fig. 3 by the lug 175. When, during a resetting operation, the rock shaft 168 is rocked counterclockwise (Fig. 3) the lug 175 moves with the shaft so that the arm 164 and the cooperating latch 178 may be moved into operative positions by the spring 181. When the lug 167 on the gear 40 comes around and engages the end of the latch, the latter will move upwardly and after the lug engages the free end of the arm 164, the latch will drop down so that the abutment 180 thereof lies behind the lug and thus prevents rebound of the gear 40. At the end of the resetting operation, the rock shaft is rocked clockwise (Fig. 3) and, due to the interengagement between the lugs 174 and 175, the arm 164 and the associated latch are moved up to inoperative positions. The arms 164 and 164' are operated in unison and, to this end, the shafts 168 and 168' are provided adjacent their left hand ends, (see Figs. 3 and 4) with fixed levers 183 and 183' connected by a link 184.

As stated, the stop arms 164 and 164' associated with the order elements of lowest denomination are controlled in timed relation to the engagement and disengagement of the main clutches 20 and 20', the reason for this being to insure that, irrespective as to the position of the cents wheels at the beginning of a resetting operation, the order elements of lowest order will, through the clutches, turn the drives backwardly to the same extent each time a resetting operation is effected. It is understood, for example, that if the cents wheels were at zero at the beginning of a resetting operation, and the arms 164 and 164' were in stopping position, the order elements of lowest order would not be rotated backwardly and, therefore, the desired picking up of backlash and looseness in the drives would not be accomplished. Movements of the arms 164 and 164' into and out of stopping positions are controlled through the arrangement now to be described. The reset operating shaft 22, upon each resetting operation, is turned through somewhat more than 360° and is then turned in the reverse direction to its starting position. The reverse rotation of the resetting shaft at the end of resetting is accomplished by the cam 121 and a follower pin 190 carried by a lever 191 journaled on a stud 192 carried by the frame member 10 (see Fig. 3). The periphery 193 of the cam 121 is concentric to the axis of rotation of the reset operating shaft 22 and has a notch 194. The follower pin 190 is retained in engagement with the periphery of the cam 121 by a spring 195 anchored at one end to the rod or shaft 46 and connected at its other end to the lever 191. Normally, the follower pin engages in the notch 194 as shown in Fig. 3. Upon initial rotation of the reset operating shaft, the follower pin is forced out of the notch and then rides on the periphery 193 of the cam 121 and then, after one complete revolution of the cam, the follower pin drops back into the notch and, due to the force of the spring 195, the cam, together with the reset operating shaft to which it is secured, is turned reversely through a small angle. Fixed to the right hand end of the reset operating shaft 22 and located outside of the frame member 11 are a stop actuating cam 197 and a reset limiting cam 198 (see Fig. 8). The cam 197 has an elongated notch in its periphery, and this notch provides a dwell portion 199 at the forward end of which is a radial shoulder 200 and at the rear end of which is a curved cam surface 201. The cam 198 is of like radius as the dwell portion 199 of the cam 197 and it has on its periphery a tooth 202, the forward end of which is radially disposed and the rear face of which is inclined inwardly towards the periphery of the cam. The tooth 202 is spaced rearwardly from the cam surface 201. Pivoted to a stud 203 carried by the frame member 11 is a connector 204 comprising a plate located in the plane of the cam 198. This connector has a stop finger 205 adapted to ride on the periphery of the cam 198 and adapted to be engaged by the radial face of the tooth 202 upon completion of rotation of the reset operating shaft 22 in a resetting direction. The connector is connected by means of a link 206 to a lever 207 fixed to the right hand end of the rock shaft 168 which carries the stop arms 164, 165 and 166. Pivoted, as at 208, to the connector 204 is a trigger 209 located in the plane of the cam 197. The lower end of this trigger has an abutment 210 adapted to be engaged by the abutment 200 upon reverse rotation of the reset operating shaft at the end of the resetting operation. The trigger also has a hump 211 adapted, upon initial rotation of the reset operating shaft, to be engaged by the cam surface 201 and to thereafter ride upon the larger periphery of the cam 197. The lower end of the trigger is normally urged towards the cam 197 by a spring 212 connected at its opposite ends to the upper end of the trigger and to the connector. The connector has a flange 213 extending into the plane of the trigger 209 so as to form a stop for limiting the extent to which the finger may pivot counterclockwise (referring to Fig. 8) with respect to the connector. The connector also has an upright finger 214, the upper end of which is V-shaped so as to provide a wedge 215 with which cooperates the V-shaped end 216 of a spring 217 anchored as at 218.

The operation of the stop arm operating mechanism just described is briefly as follows: The parts are normally in the position shown in Figs. 1 and 3 wherein the follower pin 190 is engaged in the notch 194 of the cam 121 by means of which the reset operating shaft is reversed at the end of resetting. The connector 204 is in raised position with the lower end of the trigger 209 opposed to the abutment 200 of the cam 197. The stop arms 164 and 164' are in inoperative positions. Upon initial rotation of the resetting shaft in the resetting direction, the transfer pinions are declutched, the reset gears are engaged, and the main clutches are disengaged, and then the cam surface 201 of the stop arm operating cam 197 engages the hump 211 of the trigger 209 with the result that the connector is moved to the position shown by unbroken lines in Fig. 8. The stop operating arms 164 and 164' are now in operative positions, the end of the finger 205 rides on the periphery of the reset limiting cam 198, and the hump 211 of the trigger rides on the larger periphery of the cam 197. Adjacent the end of the resetting operation, the notch in the cam 197 again registers with the hump 211 of the trigger so that the trigger will assume the long-and-short dash line position shown in Fig. 8 without, however, disturbing the position of the connector 204. After the reset operating shaft has been turned somewhat more than 360°, the tooth 202 of the cam 198 engages the end of the finger 205 of the connector (note the long-and-short dash position of the tooth 202 in Fig. 8) so that further rotation of the resetting shaft is stopped and at this time the follower pin 193 (see Fig. 3) drops into the notch 194 of the cam 121 with the result that the reset operating shaft is reversely turned to a limited extent, as previously described. When this shaft is thus turned reversely, the shoulder 200 of the stop arm operating cam 197 will engage and lift the lower end of the trigger with the result that the connector will be moved from the position shown in Fig. 8 back to its normal position shown in Fig. 1. The interengaged wedges 215 and 216 on the connector and the spring 217 respectively insure that the connector and the parts associated therewith are snapped from one extreme position to the other.

The mechanism is provided with a totalizer 225 for registering the total amount of money received for the quantity of liquid dispensed during a succession of transactions, and a like totalizer 226 for registering the total amount of liquid dispensed (see Fig. 1). These totalizers may be of any suitable sort, such, for example, as counters of the type having a plurality of non-resetting counter wheels and suitable transfer mechanism between the wheels. The counters, therefore, are not shown in detail. The cost totalizer may be driven in unison with the counters I and II through any suitable mechanism. In the present instance (see Figs. 1 and 5), the drive of the cost totalizer is effected through a bevel gear 227 fixed to the variator shaft 19 and meshing with a bevel gear 228 carried by a shaft 229 and which shaft carries a gear 230 meshing with a gear 231 fixed to the first wheel of the totalizer. The amount totalizer 226 is driven in timed relation to the amount indicators 3 and 4 through the following connections: gear 232 fixed to the order element shaft 17' and preferably carried by the heretofore defined collar or hub 69'; gear 233 journaled on a stud carried by the frame member 11; bevel gear 234 carried by a shaft 235 to which is fixed a gear 236 meshing with a gear 237 fixed to the first wheel of the amount totalizer.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In combination, a plurality of rotary order elements, numeral wheels respectively associated therewith, a reset operating shaft, a reset driving train between said reset shaft and each of said elements and including a driving gear associated with said shaft and a driven gear carried by the element, a slip clutch associated with one of the gears of each train, means associated with said shaft for moving said driving reset gears into and out of meshing relation with said driven reset gears and means for stopping said order elements in zero positions.

2. In combination, a plurality of rotary order elements, numeral wheels respectively associated therewith, a reset operating shaft, a reset driving train between said reset shaft and each of said elements and including a driving gear associated with said shaft and a driven gear carried by the element, a slip clutch associated with one of the gears of each train, means associated with said shaft for moving said driving reset gears into and out of meshing relation with said driven reset gears, means for supporting said driving reset gears for limited independent movements relative to said shaft to insure meshing of the gears when moved into engagement, and stop means to stop rotation of said order elements when the latter are reset to zero positions.

3. In combination, a plurality of rotary order elements, numeral wheels respectively associated therewith, each of said elements having a driven reset gear, frictionally carried thereby, a plurality of driving reset gears respectively associated with said driven reset gears, a reset operating shaft for rotating said driving reset gears, means associated with said shaft for moving said driving reset gears into and out of meshing relation with said driven reset gears and means for stopping said rotary elements when the same are reset to zero positions.

4. In combination, a plurality of rotary order elements, numeral wheels respectively associated therewith, each of said elements having a driven reset gear frictionally associated therewith, a reset operating shaft, a plurality of driving reset gears rotatable with said shaft and movable axially thereof and respectively associated with said driven reset gears, means operable upon rotation of said operating shaft for moving said driving reset gears axially into engagement with said driven reset gears and for moving the same axially in the opposite direction to disengage the same after the order elements have been reset to zero, means for supporting said driving reset gears for independent axial and tilting movements relative to said shaft to insure proper meshing of the gears when brought into engagement, and means for stopping said rotary elements when the same have been reset to zero positions.

5. In combination, a plurality of coaxial order elements, numeral wheels respectively associated therewith, each of said order elements being provided with a driven reset gear frictionally associated therewith, a rotatable member parallel to the axis of said order elements and movable axially, said member having radially disposed faces, driving reset gears on said member adapted to respectively engage said faces and to respectively mesh with said driven reset gears, spring means for urging said driving reset gears against said faces, reset means for rotating said rotatable member and for moving said member axially in one direction to engage the driving reset gears with the driven reset gears and for moving it in the opposite direction to disengage said gears after the order elements have been reset and means for stopping said order elements in zero positions.

6. In combination, a plurality of numeral wheels, a plurality of rotary order elements respectively associated therewith and each provided with a driven reset gear frictionally associated therewith, a reset operating shaft, a sleeve on said shaft rotatable therewith and movable longitudinally thereof, said sleeve having arms provided with radially disposed faces and with lugs, a plurality of driving reset gears respectively associated with said driven reset gears and having openings receiving said lugs whereby the gears will rotate with said sleeve, springs urging said driving reset gears against said radial faces, cam means associated with said sleeve for moving the same axially to engage the driving reset gears with the driven reset gears upon rotation of said reset operating shaft and to disengage said gears at the end of the resetting operation and means for stopping said order elements in zero positions.

7. In combination, two counter mechanisms, each of said mechanisms having a plurality of rotary order elements, numeral wheels respectively associated therewith, and a driven reset gear frictionally carried by each order element; the driven reset gears of one set of order elements being in the same respective planes as the corresponding driven reset gears of the other set of elements, a reset operating shaft between said two sets of elements, a plurality of driving reset gears supported by said operating shaft for rotary movement therewith and for axial movement thereof, means associated with said shaft for moving said driving reset gears into and out of mesh with said driven reset gears and means for stopping said order elements in zero positions during a resetting operation.

8. In combination, two counter mechanisms, each of said mechanisms having a plurality of rotary order elements, numeral wheels respectively associated therewith, and a driven reset gear frictionally carried by each order element; the driven reset gears of one set of order elements being in the same respective planes as the corresponding driven reset gears of the other set of elements, a reset operating shaft between said two sets of elements, a plurality of driving reset gears supported by said operating shaft for rotary movement therewith and for axial movement thereof, means associated with said shaft for moving said driving reset gears into and out of mesh with said driven reset gears, means on said reset operating shaft for supporting said driving reset gears for independent axial and tilting movements to insure proper meshing of said gears when brought into engagement, and means for limiting the extent of rotation of each of said elements on each resetting operation.

9. In combination, two counter mechanisms, each of said mechanisms having a plurality of rotary order elements, numeral wheels respectively associated therewith, and a driven reset gear frictionally carried by each order element; the driven reset gears of one set of order elements being in the same respective planes as the corresponding driven reset gears of the other set of elements, a reset operating shaft between said two sets of elements, a sleeve rotatable with and movable axially of said operating shaft, a plurality of driving reset gears carried by said sleeve and having limited axial and tilting movements relative thereto to insure proper meshing of the gears when brought into engagement, springs carried by said sleeve and normally urging said driving reset gears to normal positions with respect thereto, means associated with said sleeve and shaft for moving said sleeve axially and means for stopping said rotary elements in zero positions on each resetting operation.

10. In combination, a plurality of rotary order elements each having a stop abutment, numeral wheels respectively associated therewith, each of said elements having a driven reset gear frictionally carried thereby, a plurality of driving reset gears respectively associated with said driven reset gears, stop members arranged to cooperate with said stop abutments to stop rotation of said order elements when the latter are reset to zero positions, a reset operating shaft for rotating said driving reset gears, means associated with said shaft for moving the stop member associated with the order element of lowest denomination into and out of stopping position, and means associated with said shaft for moving said driving reset gears into and out of meshing relation with said driven reset gears.

11. In combination, a plurality of rotary order elements, numeral wheels respectively associated therewith, transfer pinions between successive order elements and mounted for movement into and out of operative position with respect thereto, each of said elements having a driven reset gear frictionally carried thereby, a plurality of driving reset gears respectively associated with said driven reset gears, a reset operating shaft for rotating said driving reset gears, means associated with said shaft for moving said driving reset gears into and out of mesh with said driven reset gears, means associated with said shaft for moving said pinions to inoperative position before said gears are engaged and into operative position after said gears have been disengaged and means for stopping said order elements in zero positions on each resetting operation.

12. In combination, a counter having a plurality of rotary order elements, numeral wheels respectively associated therewith, means for driving the order element of lowest order and including a disengageable clutch, means for resetting said order elements in a direction opposite to that in which they are rotated during a registering operation, and means controlled by said resetting means for disengaging said clutch after the order element of lowest denomination has been initially turned in a resetting direction and for again engaging said clutch after said last-mentioned order element has been reset to zero.

13. In combination, a counter having a plurality of order elements, numeral wheels respectively associated therewith, means for driving the order element of lowest denomination and including a disengageable clutch, means ineffective during a registering operation and arranged to restrain the elements of the drive against displacement when the clutch is disengaged, means for resetting said order elements in a direction opposite to that in which they are rotated during a registering operation, and means associated with said resetting means for disengaging said clutch and rendering said restraining means effective after the order element of lowest denomination has been initially turned in a resetting direction.

14. In combination, a shaft, a plurality of rotary order elements carried thereby, means for driving the order element of lowest denomination and including a disengageable clutch having a driving member and a driven member, means ineffective during a registering operation and arranged to restrain the elements of the drive against displacement when the clutch is disengaged, said restraining means including a fixed abutment and a friction abutment on said shaft, means for resetting said order elements in a direction opposite to that in which they are rotated during a registering operation, and cam means associated with said resetting means for disengaging said clutch and moving said friction abutment into engagement with said fixed abutment after the order element of lowest order has been initially turned in a resetting direction.

15. In combination, a counter having a plurality of rotary order elements, numeral wheels respectively associated therewith, means for driving the order element of lowest denomination and including a disengageable clutch, means ineffective during a resetting operation and arranged to restrain the elements of the drive against displacement when the clutch is disengaged, means for resetting said order elements in a direction opposite to that in which they are rotated during a registering operation, means for stopping the wheel of lowest order in zero position during a resetting operation, means associated with said resetting means for disengaging said clutch and rendering said restraining means effective after the order element of lowest denomination has been initially turned in a resetting operation, and means associated with said resetting means for thereafter moving said stop means into stopping position.

16. In combination, a counter having a plurality of rotary order elements, numeral wheels respectively associated therewith, means for driving the order element of lowest denomination and including a disengageable clutch, means effective during a registering operation and arranged to restrain the elements of the drive against displacement when the clutch is disengaged, means for resetting said order elements in a direction opposite to that in which they are rotated during a registering operation, stop means movable into and out of operative position and associated with the order element of lowest denomination for stopping resetting movement thereof when the same reaches a zero position, means associated with said resetting means for disengaging said clutch and rendering said restraining means effective after the order element of lowest denomination has been initially turned in a resetting direction and for engaging said clutch and rendering said restraining means ineffective adjacent the end of the resetting operation, and means associated with said resetting means for moving said stopping means to operative position after said clutch is disengaged and for moving said stopping means to inoperative position after the clutch is again engaged.

17. In combination, a counter having a plurality of rotary order elements, numeral wheels respectively associated therewith, means for driving the order element of lowest denomination and including a disengageable clutch, means ineffective during a registering operation and arranged to restrain the elements of the drive against displacement when the clutch is disengaged, stop means associated with the order element of lowest denomination for stopping the same at zero position during a resetting operation, a reset operating shaft adapted to be rotated in one direction during a resetting operation and to be turned reversely on completion of the resetting operation, cam means associated with said shaft for disengaging said clutch and rendering said restraining means effective after the order element of lowest denomination has been initially turned in a resetting direction and for disengaging said clutch and rendering said restraining means ineffective adjacent the completion of the resetting operation, and cam means associated with said shaft for moving said stop means to operative position after said clutch is disengaged and for moving said stop means to inoperative position upon reverse rotation of said reset operating shaft.

18. In combination, a counter having a plurality of rotary order elements, numeral wheels respectively associated therewith, means for driving the element of lowest order and including a disengageable clutch, each of said elements having a driven reset gear frictionally carried thereby, a plurality of driving reset gears respectively associated with said driven reset gears, means ineffective during a registering operation and arranged to restrain the elements of the drive against displacement when the clutch is disengaged, a reset operating shaft for rotating said driving reset gears and thereby resetting said order elements in a direction opposite to that in which they are rotated during a registering operation, means associated with said shaft for moving said driving reset gears into and out of meshing relation with said driven reset gears, means associated with said shaft for disengaging said clutch and rendering said restraining means ineffective after the order element of lowest denomination has been initially turned in a resetting direction and stop means for limiting the extent of rotation of each of the rotary elements on each resetting operation.

19. In combination, a counter having a plurality of rotary order elements, means for driving the element of lowest order and including a disengageable clutch, each of said elements having a driven reset gear frictionally carried thereby, a plurality of driving reset gears respectively associated with said driven reset gears, stop means for limiting the resetting movement of said order elements when they have reached a zero position, a reset operating shaft for rotating said driving reset gears and thereby resetting said order elements in a direction opposite to that in which they are rotated during a registering operation, means controlled by said shaft for moving said reset driving gears into and out of meshing relation with said driven reset gears, means associated with said shaft for disengaging said clutch after the order element of lowest denomination has been initially turned in a resetting direction and for engaging the clutch after the order elements have been reset to zero, and means for moving the stop means associated with the order element of lowest denomination into stopping position after said clutch is disengaged and for moving said stop means to inoperative position after said clutch is again engaged.

20. In combination, a counter having a plurality of rotary order elements, means for driving the element of lowest order and including a disengageable clutch, means ineffective during a registering operation and arranged to restrain the elements of the drive against displacement when the clutch is disengaged, a reset operating shaft for resetting said order elements in a direction opposite to that in which they are rotated during a registering operation, disengageable connections between said operating shaft and each of said order elements and adapted to slip after the order elements have been returned to zero, stop means for limiting rotation of said order elements when they have reached zero position, and means controlled by said resetting shaft for engaging said connections, disengaging said clutch after the order element of lowest order has been initially turned in a resetting direction, moving said stop means to stopping position after said clutch has been disengaged, and then engaging the clutch, disengaging said connections, and moving said stop means to inoperative position.

21. In combination, a counter having a rotary order element, means for resetting said counter to zero and including a reset operating shaft, a stop lug rotatable with said element, a stop member movable into and out of operative position and cooperating with said lug for limiting the extent of rotation of said element on each resetting operation, means for imparting a slight retrograde rotation to said reset operating shaft upon completion of each resetting operation, a stop operating cam rotatable with said shaft and having a dwell with an abutment at its forward end and a cam surface at its rear end, a second cam rotatable with said first cam and having an abutment, a pivoted connector connected to said stop member and having a finger against which said last-mentioned abutment is adapted to engage to limit the extent of rotation of said shaft in a resetting direction, and a trigger pivoted on said connector and having a hump cooperating with the periphery of said stop operating cam and an abutment face adapted to be engaged by said first abutment upon retrograde rotation of said reset operating shaft.

EDWARD A. SLYE.